US005950117A

United States Patent [19]

Zorer

[11] Patent Number: 5,950,117

[45] Date of Patent: Sep. 7, 1999

[54] CAR RADIO RECEIVER COMPRISING A MEMORY FOR STORING PREDETERMINED VOCABULARY ELEMENTS

[75] Inventor: Jean-Louis Zorer, Coulambs, France

[73] Assignee: VDO Control Systems, Inc., Frankfurt, Germany

[21] Appl. No.: 08/631,384

[22] Filed: Apr. 12, 1996

[30] Foreign Application Priority Data

Apr. 12, 1995 [FR] France .................................. 95 04401

[51] Int. Cl.$^{6}$ .............................. G08G 1/09; G06F 15/48

[52] U.S. Cl. .................................... 455/186.1; 455/186.2; 455/54.2; 455/45

[58] Field of Search .................................. 455/45, 186.1, 455/186.2; 340/905, 990, 995

[56] References Cited

U.S. PATENT DOCUMENTS

| | | | |
|---|---|---|---|
| 4,821,270 | 4/1989 | Mauge | 371/41 |
| 5,065,452 | 11/1991 | Duckeck et al. | 455/186.1 |
| 5,444,720 | 8/1995 | Schwaiger | 371/41 |
| 5,465,088 | 11/1995 | Braegas | 340/905 |
| 5,491,838 | 2/1996 | Takahisa et al. | 455/45 |
| 5,493,709 | 2/1996 | Duckeck et al. | 455/185.1 |
| 5,507,021 | 4/1996 | Siegle | 455/186.2 |
| 5,515,372 | 5/1996 | Porter | 455/45 |
| 5,603,108 | 2/1997 | Thoone | 455/186.1 |

FOREIGN PATENT DOCUMENTS 0263332 4/1988 European Pat. Off. .

*Primary Examiner*—Anand S. Rao
*Attorney, Agent, or Firm*—Mayer, Brown & Platt

[57] ABSTRACT

A vocabulary memory which contains descriptions of vocabulary elements is addressable by a code which is formed by a number designating a vocabulary element, but the set of useful codes for a given user comprises gaps (32–38) between groups of consecutive numbers which are referred to as segments (24–31). The vocabulary memory contains segments which are arranged end to end and the receiver comprises an auxiliary memory which contains, for a given segment (27), the smallest and largest code values of this segment and the position in the vocabulary memory of descriptions corresponding to the codes contained in this segment, as well as the addresses (225, 230) in said auxiliary memory of data of two other segments (25, 30) of the sequence of segments, some of which are situated above and some of which are situated below said given segment etc. in order to form a classification in the form of a tree.

17 Claims, 2 Drawing Sheets

CAR RADIO RECEIVER COMPRISING A MEMORY FOR STORING PREDETERMINED VOCABULARY ELEMENTS

BACKGROUND OF THE INVENTION

The present invention relates to a car radio receiver, comprising a vocabulary memory containing descriptions of vocabulary elements, each of said vocabulary element descriptions in said memory being addressable by means of a code which is formed by a number designating a vocabulary element, the set of numbers designating the useful vocabulary elements for a given user constituting a sequence of numbers with gaps between groups of consecutive numbers, a group of consecutive numbers being referred to as a segment.

A car radio receiver of this kind is intended notably for the reception and use of so-called RDS/TMC signals. It can deliver information messages concerning traffic or intended to guide a vehicle by displaying the messages on a screen and/or reproducing them by vocal synthesis.

A radio broadcast receiver in which digital traffic information signals are processed and which comprises a memory for converting the digital signals into comprehensible information is known from the document EP-A 0 263 332. According to the cited document, the memory is subdivided into sub-assemblies, each of which contains the data of a part of a route, corresponding to a town encountered along said part of the route.

The set of codes and definitions of vocabulary elements, however, constitute a database which is nowadays defined and in which the vocabulary elements are grouped in a manner which cannot be modified.

SUMMARY OF THE INVENTION

It is an object of the invention to reduce the size of the vocabulary memory of the receiver and also to ensure as fast as possible access to a vocabulary element by means of its code.

To this end, the car radio receiver in accordance with the invention is characterized in that the descriptions corresponding to the codes contained in the various segments are arranged end to end in the vocabulary memory, and that the receiver comprises an auxiliary memory which contains digital data enabling determination, for each code, of the position of the corresponding description in the vocabulary memory.

Thus, the invention is based on the idea of packing the groups in the vocabulary memory as densely as possible, despite the complication introduced by the necessity to use indirect addressing to access a group.

A first method of controlling the vocabulary memory is to use an auxiliary memory which contains, for each of the useful codes for a given user, the position of the corresponding description in the vocabulary memory.

A second method of controlling the vocabulary memory is to use an auxiliary memory which contains, for a given segment, the smallest code value contained in the segment, the largest code value contained in the segment, and the position in the vocabulary memory of the description corresponding to the code situated at one of the limits of the segment.

Using this auxiliary memory, for a given code value it suffices to compare it successively with the limits of successive segments found in the auxiliary memory in order to find the segment containing the description of the vocabulary element corresponding to this code, and hence obtain its position in the vocabulary memory.

Preferably, for a given segment a so-called “tree” memory contains the address in the auxiliary memory of data of another segment of the sequence of segments, situated substantially in the middle of those which are below said given segment and the address in the auxiliary memory of data of another segment which are situated substantially in the middle of those which are above said given segment.

This enables the use of a tree process for the searching of a segment and also enables faster searching.

If there is no segment still to be taken into account above or below the given segment, the treelike memory contains a special signal to indicate this fact.

Preferably, the auxiliary memory and the treelike memory constitute one and the same memory.

The receiver is preferably provided with a card reader and the vocabulary memory and the auxiliary memory are accommodated in a removable card.

The apparatus can thus be readily adapted to different regions simply by replacing the card.

These and other aspects of the invention will be apparent from and elucidated with reference to the embodiments described hereinafter.

DESCRIPTION OF THE PREFERRED EMBODIMENTS

Figure 1:
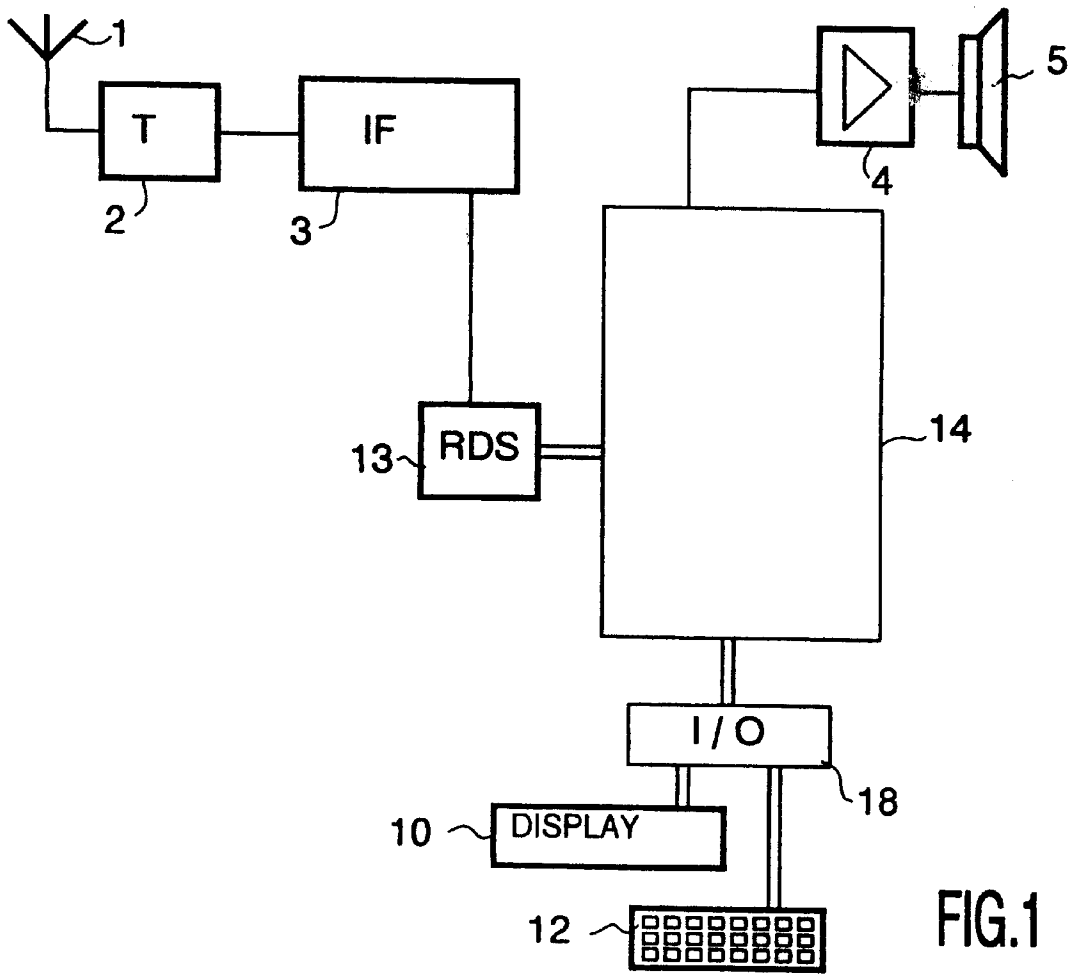
FIG. 1 shows diagrammatically a car radio receiver in conformity with the invention.

Subsequent to an aerial 1, the receiver shown in FIG. 1 comprises a device 2 (tuner) which comprises a tuning circuit and a frequency control circuit, followed by a device 3 which comprises an intermediate frequency amplifier and a demodulator.

In the so-called RDS (Radio Data System) process, an FM subcarrier is modulated by digital data signals for the reception of various stations of the same chain. Also provided is a known decoder 13 for RDS messages.

In the case of the so-called TMC (Traffic Message Channel) process, information messages concerning traffic are incorporated in given digital fields of the RDS signals, for example “traffic jam three kilometres before Paris entrance”.

For the processing of the TMC messages, the receiver comprises a module 14 in which the RDS data from the decoder 13 are received so as to be analysed and possibly stored. In order to enable output of the messages in vocal form, the module 14 is also connected to an audio amplifier system 4 which is followed by a loudspeaker 5. It is also connected to an input/output interface device 18 which is connected to a control keyboard 12 and to a display screen 10, for example a liquid crystal display screen.

Figure 2:
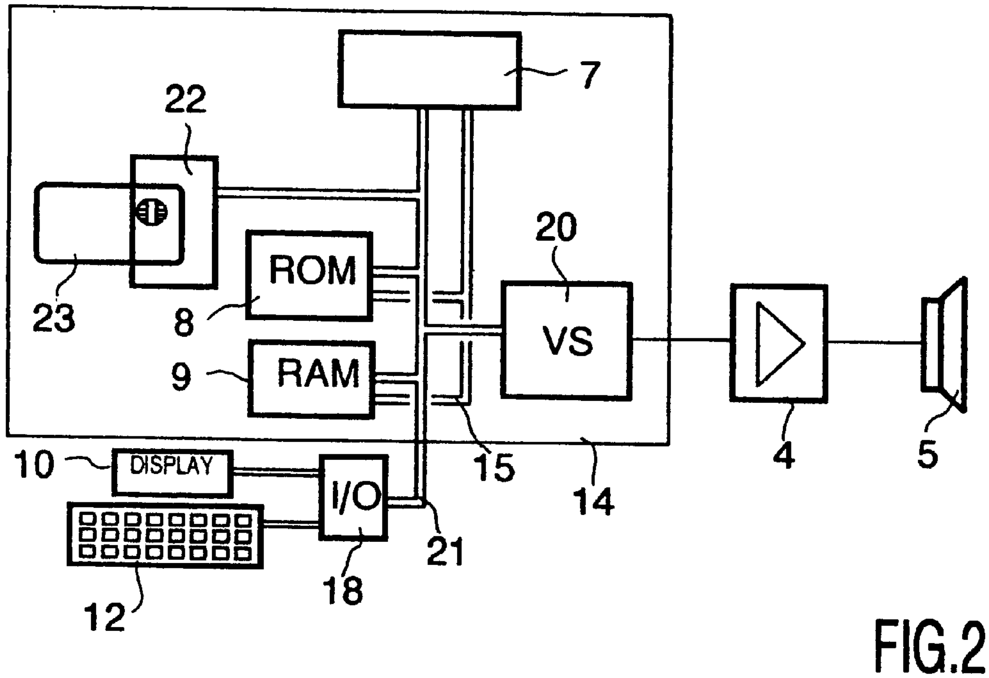
FIG. 2 is a more detailed representation of the part whereto the invention relates as well as of its connections to the remainder of the apparatus.

The module 14 in FIG. 2 comprises a microcontroller 7 which generates control signals and processes the signals supplied by the various devices whereto it is connected via an address bus 15 and a data bus 21. It also selects and prepares digital data defining speech elements for a speech synthesizer module 20 which is known per se and which applies the desired analog signals in known manner to the audio amplifier 4 followed by the loudspeaker 5. The module 14 also comprises a volatile memory 8, being a so-called RAM, for the storage of a software layer used at a given instant by the microcontroller 7 and also for the provisional storage of the contents of TMC fields to be processed, a permanent memory 9 for the storage of vocabulary descriptions which are fixed once and for all, and a memory 22, 23 which is formed by a memory card reader 22 and a removable memory card 23, for example of the type PCMCA, in which notably the descriptions of specific vocabulary elements corresponding to a given user and/or a given region are stored.

The standard TMC messages are formed by several digital data fields, received in the RDS data, which designate the vocabulary elements by means of their respective code:

- a first field, comprising 11 bits, which contains the code of a vocabulary element describing an event,
- a second field, comprising 16 bits, which contains the code of a vocabulary element defining the location whereto the relevant event relates,
- a third field, comprising 3 bits, which contains the code of a vocabulary element describing an extension of the location concerned,
- a fourth field, comprising 1 bit, which describes the direction of the route concerned,
- a fifth field, comprising 3 bits, which provides the duration of the validity of the message,
- a sixth field, comprising 1 bit, which indicates whether or not it is recommended to take a detour.

The contents of each field must be processed so as to express in plain form what is concerned. To this end, there is provided a permanent memory in which information is stored in plain form (for example as ASCII codes of characters of a message to be displayed) at addresses corresponding to the different possible contents of each field, thus enabling the retrieval of the information on the basis of the contents of a field.

For example, the first field (describing an event), comprising 11 bits, is associated with a memory which can contain 2048 vocabulary elements in plain form (so $2^{11}$ vocabulary elements), each of which is found at the address defined by the contents of the field. These vocabulary elements say, for example "traffic jam", "roadwork ahead", "accident", etc. They are stored in the memory 9.

The second field (describing a location), comprising 16 bits, is associated with a memory which is referred to as a location point memory and which is capable of containing as many as 65,536 vocabulary elements in plain form (so $2^{16}$ vocabulary elements) which comprise complete data concerning notably the place names, their type, the region in which they are situated, the next points and preceding points, etc., each vocabulary element in principle being found at an address designated by the contents of the field. These vocabulary elements are, for example "Paris" or "Lille" or "exit 21", etc. They are stored in the memory 23.

In the third field, various types of extensions are defined. An extension is to be understood to mean that the event considered extends, for example as far as the next location.

In the fourth field a 0 bit signifies, for example "direction Paris→Lille", whereas a 1 bit signifies "direction Lille→Paris" (the contents of field 2 reveal that a link between Paris and Lille is concerned, but the direction still fails).

The nature of a problem is defined by the information in plain form which corresponds to a code contained in field 1, and the location in which the problem occurs is defined by the information corresponding to a code of the field 2. The codes contained in the field 2 are referred to as "PL" (Point of Location). They are represented by numbers and there are gaps in the sequence of these numbers. For example, in order to define the location points of the Rhine valley, the numbers PL extend from 258 to 264, and subsequently from 930 to 983, and so on.

For the description of each location point (each place name) there are provided 170 data bytes. In the case of the Rhine valley, the largest number PL is 50004, so that a location point memory in which the address of the data describing a location point would be the code itself would require a capacity of 50004 times 170 bytes, so 8500680 bytes.

It has been contemplated to reduce the size of the vocabulary memory containing the descriptions of location points. To this end, in the normalized database there are considered only the location points which are useful in a given region and for which the numbers PL are consecutive. They form groups which are referred to as "segments". In the location point memory of the receiver these segments are concatenated, i.e. they are arranged end to end without gaps. As a result of this organization, the use of a memory of limited size suffices. The segments thus being concatenated, in order to establish the relationship between a code and a given segment it would be feasible to use an auxiliary memory containing, for each of the 50004 possible codes (Rhine valley case), the direct indication of the position of the data describing the location point in the vocabulary memory. The total capacity of the memory (descriptions of the location points plus auxiliary memory) would then be 1285 times 170 bytes, so 218450 bytes, for the descriptions of the location points, and for the auxiliary memory: two bytes for each number PL of the complete range of numbers PL, so 5004 times 2 bytes=100008 bytes, so all together only 318458 bytes instead of 8500680 bytes.

The relationship between a code and a segment can also be retrieved by using an auxiliary memory which contains the smallest and the largest number PL of each segment and in which the actual position of descriptions corresponding to the segment is also indicated by giving the position of one of the limits corresponding to this segment in the vocabulary memory, for example the position of its lower limit, which is referred to as "offset". In order to retrieve the segment in which a given number PL is situated, it is thus necessary to compare this given number PL with the smallest and the largest number PL of each segment (found in the auxiliary memory) until the segment is found which contains the given number PL. In order to obtain the address of the description of the location point corresponding to PL in the vocabulary memory, it then suffices to add to the offset a shift which is the difference between the given number PL and the smallest number contained in the segment. The above example of the Rhine valley involves 196 segments, so that 196 times 6 bytes (2 for the smallest number, 2 for the largest number and 2 for the position of the segment) or 1176 bytes are required in the auxiliary memory and still 218450 bytes for the location point memory, a total of 219626 thus being required instead of the 318458 bytes mentioned above; however, the determination of an address is then slightly more time-consuming.

Nevertheless, it is also possible to achieve a considerable reduction of the time necessary for accessing the description of a location point. To this end, the order in which the segments are arranged in the vocabulary memory is considered, which order is based on the value of the numbers PL contained in the segments. It will be assumed that a second segment is higher with respect to a first segment if the smallest number PL of the second segment is larger than the largest number PL of the first segment.

Thus, data representing a tree via which the segments are accessed are stored in a memory element which is referred to as a "treelike memory". In practice this means that in said memory element there are stored blocks of data which are referred to as nodes, each of said nodes defining a segment while indicating the address of two other nodes in the same treelike memory. For example, the root node, assumed to have the level "0", defines the median segment, that is to say the segment placed substantially in the middle of the sequence of the segments, and indicates two other nodes, i.e.:

a first node, said to have the level "−1", which defines
- a segment situated substantially in the middle of the plurality of the segments situated below said median segment,
- and in its turn indicates two other nodes, having the level "−2", a second node, also of the level "−1", which defines
- a segment which is placed substantially in the middle of the plurality of segments situated above said median segment,
- and in its turn indicates two other nodes, having the level "−2".

The term "substantially in the middle" is to be understood to mean notably that when the number of segments is even, no segment is situated strictly in the middle.

When a code is searched on the basis of its number PL, it suffices to follow the tree until the segment containing the number PL is found. The depth of the tree, that is to say the maximum number of search steps required to find a segment containing a given number PL, is at most equal to the logarithm base 2 of the total number of segments contained in the vocabulary memory. The auxiliary memory, storing for each segment the smallest and the largest number PL of each segment, and the actual position of the segment, preferably forms the treelike memory by adding the addresses of two other nodes each time.

Figure 3:
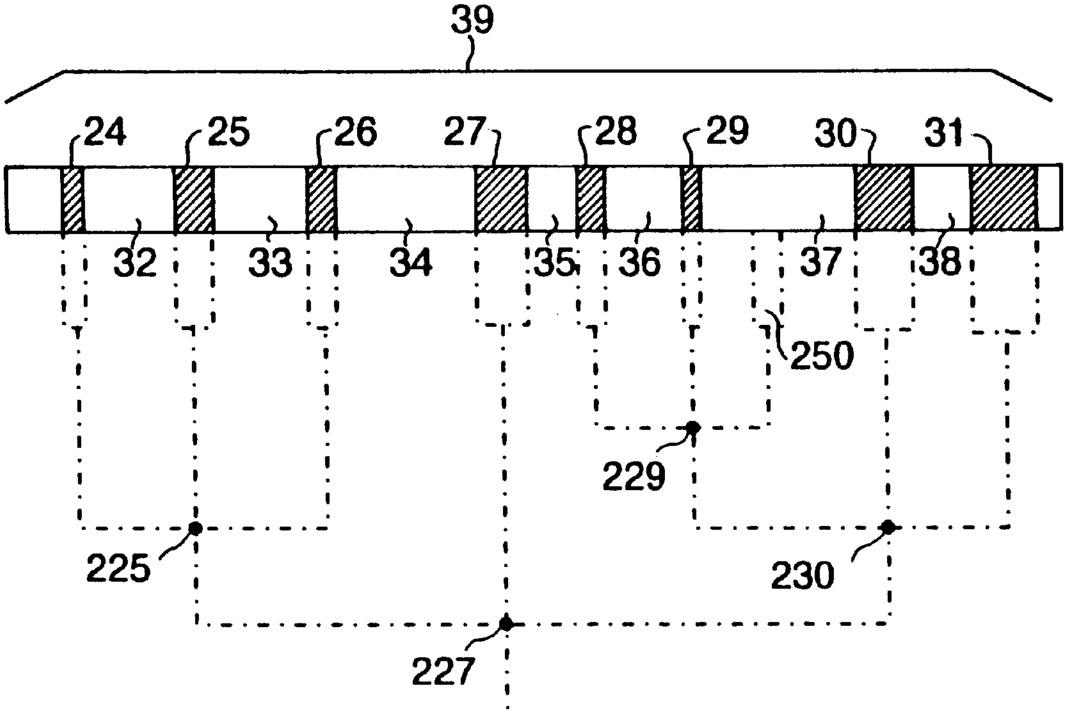
FIGS. 3 and 4 show two examples of trees enabling the retrieval of a segment in a sequence of numbers designating the vocabulary elements.

In order to illustrate the preferred manner of organizing the searching of a tree, FIG. 3 shows symbolically a sequence of numbers PL in the form of an elongate rectangle 39. It concerns the complete sequence provided by the normalization for all location points possible; it thus comprises 65536 positions. In a database concerning a country, however, only given location points are defined. They are grouped in segments 24, 25, 26, 27, 28, 29, 30, 31, shown hatched, which contain codes designating defined location points; gaps 32, 33, 34, 35, 36, 37, 38 occur between the segments. The root node (depth 0) of the tree, corresponding to the reference 227, contains inter alia the smallest and the largest number of the segment 27. Comparison of the given number PL with these two numbers offers three possibilities: either the number is present in the segment 27 and it is merely necessary to calculate the address of the description of the location point as explained above, or it is situated to the right in the Figure (larger numbers) or to the left (smaller numbers). At the level of the root node 227 there are also indicated the addresses in the auxiliary memory of the median nodes below 225 and above 230, thus enabling the tree to be followed by choosing one of these addresses in conformity with the comparison result.

If the number PL is larger than the largest number of the segment 27, the next node, having a depth −1, is that which corresponds to the reference 230; it contains the smallest number and the largest number of the segment 30. If the number PL is smaller than the smallest number of the segment 27, the next node, having a depth "−1", is that which corresponds to the reference 225; it contains the smallest number and the largest number of the segment 25. Comparison of the given number PL with these two numbers again offers 3 possibilities: either this number is present in the segment 25 and it is only necessary to calculate the address of the description of the location point as described above, or it is situated to the right or to the left in the Figure. For example, to the right the address indicated as the central node followed by the node 225 contains the smallest number and the largest number of the segment 26 and a code indicating that the end of the tree has been reached. The same holds for the other segments 24, 28, 31. In given cases the subdivision of the tree into branches leads to at least one terminal node which does not correspond to a segment; this is the case here for the "pseudo-segment" 250 to the right of the node 229; a code then indicates that this segment is void, either at the level of this segment or rather at the level of the upstream node (229).

Figure 4:
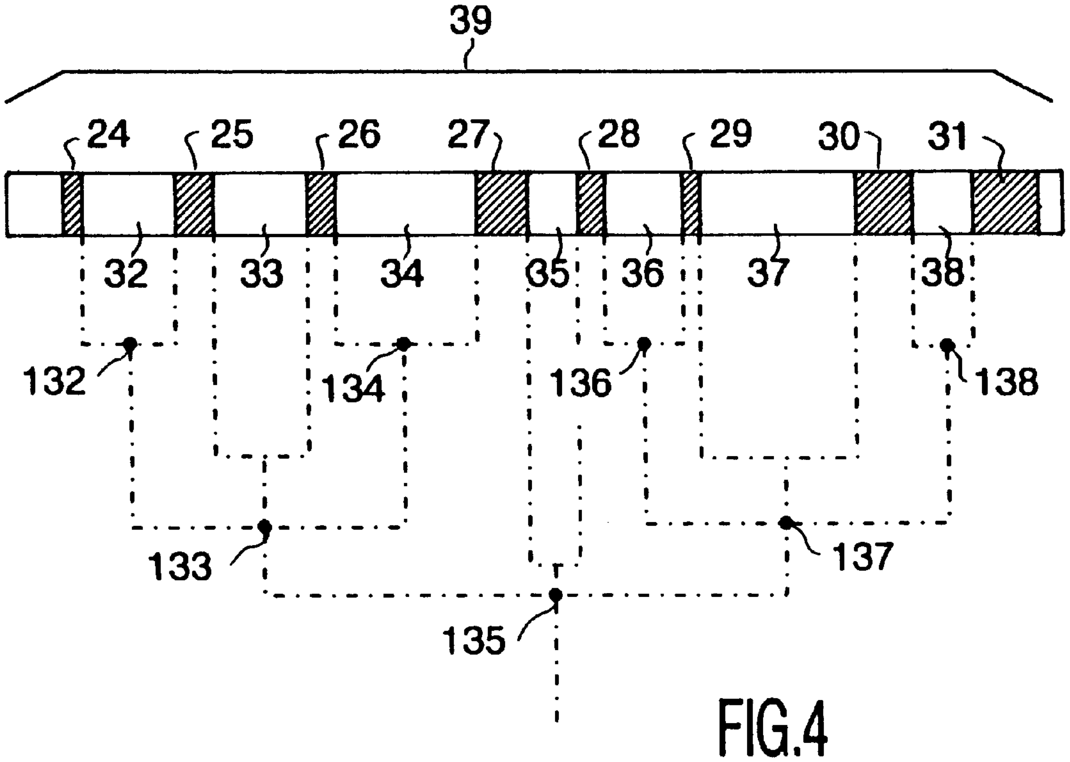

FIG. 4 shows an alternative version of the organization of the searching of a tree. It is based on the gaps between the segments instead of on the segments; however, it is more difficult to implement than the preferred method. The root node (depth 0) of the tree, corresponding to the reference 135, contains the smallest number of the segment 28 and the largest number of the segment 27, situated to both sides of the gap 35. The comparison of the given number PL with these two numbers points to the right (larger numbers) of the Figure or to the left (smaller numbers). At the level of the root node 135 there are also indicated the addresses of the lower and higher median nodes 133 and 137, respectively, in the auxiliary memory, enabling the searching of the tree. If the number PL is smaller than the largest number of the segment 27, the next node, having a depth "−1" and corresponding to the reference 133, contains the smallest number of the segment 26 and the largest number of the segment 25. If the number PL is larger than the smallest number of the segment 28, the next node, having a depth "−1" and corresponding to the reference 137, contains the smallest number of the segment 30 and the largest number of the segment 29. At the node 133 the comparison of the given number PL with the smallest number of the segment 26 and the largest number of the segment 25 points to the right of the Figure or to the left, and so on for the nodes having a depth "−2" and corresponding to the references 132, 134, 136, 138, one of which ultimately leads to the segment searched.

The characteristics of a segment (the smallest and the largest code contained in the segment and the offset) and the data enabling the next nodes of the tree to be found in the same memory can be stacked in the same memory which then forms at the same the treelike memory and the auxiliary memory. 10 data bytes are required to define each segment in the auxiliary memory, i.e. 2 bytes to indicate the smallest number PL and 2 bytes to indicate the largest number PL of the segment, 2 bytes for the offset, and 2 bytes for each of the two addresses of the next segments of the tree. In the case of the said example of the Rhine valley, involving 196 segments, therefore, 196 times 10 bytes, so 1960 bytes, are required in the auxiliary memory, and still 218450 bytes for the location point memory, i.e. a total of 220410 bytes. The tree has a depth of eight. The 220410 bytes required are slightly more than the 219626 bytes mentioned above without utilizing a tree, but the tree offers much faster access.

What is claimed is:

1. A car radio receiver, comprising a vocabulary memory containing descriptions of vocabulary elements, each of the vocabulary element descriptions having a position in said memory and being identified by means of a code which is formed by a number, a set of codes designating useful vocabulary elements for a given user consisting of a sequence of numbers with gaps between groups of consecutive numbers, a group of said consecutive numbers being referred to as a segment, characterized in that the descriptions corresponding to the codes contained in the various segments of a set for a given user are arranged end to end in the vocabulary memory, and that the receiver comprises an auxiliary memory which contains digital data enabling determination, for each code in the set, of the position of the corresponding description in the vocabulary memory.

2. A car radio receiver as claimed in claim 1, characterized in that for a given segment the auxiliary memory contains the smallest code value contained in the segment, the largest code value contained in the segment, and the position in the vocabulary memory of the description corresponding to the code situated at one of the limits of the segment.

3. A car radio receiver as claimed in claim 2, characterized in that a so-called "tree" memory contains, in correspondence with the data of a segment, addresses in the auxiliary memory of data concerning other segments, some of which are below said given segment and some of which are above said given segment.

4. car radio receiver as claimed in claim 3, characterized in that for a given segment the treelike memory contains the address in the auxiliary memory of data of another segment of the sequence of segments which is situated substantially in the middle of those which are below said given segment, and the address in the auxiliary memory of data of another segment which is situated substantially in the middle of those which are above said given segment.

5. A car radio receiver as claimed in claim 4, characterized in that if there is no segment yet to be taken into account above or below the given segment, the treelike memory contains a special sign to indicate this fact.

6. A car radio receiver as claimed in claim 3, characterized in that the auxiliary memory and the treelike memory form one and the same memory.

7. A car radio receiver as claimed in claim 1, characterized in that it comprises a card reader and that the vocabulary memory and the auxiliary memory are accommodated on a removable card.

8. A personalized car radio receiver for a car radio broadcast system in which codes are broadcasted to car radio receivers containing stored vocabulary elements, each car radio receiver determining whether a received code is relevant to said each car radio receiver and retrieving stored vocabulary elements corresponding to received relevant codes, the car radio broadcast system having a multiplicity of different predefined vocabulary elements and a unique code number corresponding to each one of the predefined vocabulary elements, the personalized car radio receiver being adapted for a particular user with respect to which only a portion of the predefined vocabulary elements are considered relevant, comprising:

a vocabulary memory that contains only a portion of the predefined vocabulary elements of the car radio broadcast system, including the predefined vocabulary elements considered relevant to the particular user, the predefined vocabulary elements in said vocabulary memory consisting of a multiplicity of groups of predefined vocabulary elements, each one of said groups consisting of one or more predefined vocabulary elements having consecutively numbered codes, the consecutively numbered codes corresponding to any said group of predefined vocabulary codes forming a segment of codes, the predefined vocabulary elements in the vocabulary memory having addresses that cannot be determined directly from the codes that correspond to the predefined vocabulary elements in the vocabulary memory; and an auxiliary memory containing information sufficient to generate from a received code that corresponds to a predefined vocabulary element in the vocabulary memory the address of the predefined vocabulary element in the vocabulary memory that corresponds to the received code, whereby the combined size of the vocabulary memory and auxiliary memory is smaller than a vocabulary memory capable of storing all of the predefined vocabulary elements of the system.

9. A personalized car radio receiver for a car radio broadcast system in which codes are broadcasted to car radio receivers containing stored predefined vocabulary elements, the car radio broadcast system including a multiplicity of different predefined vocabulary elements and having a unique code corresponding to each different predefined vocabulary element, the personalized car radio receiver being adapted for use in a particular geographical region with respect to which only a portion of the predefined vocabulary elements are relevant, comprising:

a vocabulary memory that contains only a portion of the predefined vocabulary elements of the car radio broadcast system, said portion including the predefined vocabulary elements relevant to a particular geographical region, the stored vocabulary elements in the vocabulary memory having addresses that cannot be determined directly from the codes that correspond to the stored vocabulary elements; and an auxiliary memory containing information that correlates the addresses of the predefined vocabulary elements stored in the vocabulary memory with the codes that correspond to the predefined vocabulary elements stored in the vocabulary memory, whereby any of the predefined vocabulary elements corresponding to received codes relevant to the particular geographical region can be retrieved from the vocabulary memory without storing all of the predefined vocabulary elements of the car radio receiver system in the vocabulary memory.

10. A car radio receiver as claimed in claim 8, characterized in that it comprises a card reader and that the vocabulary memory and the auxiliary memory are accommodated on a removable card.

11. A personalized car radio receiver as claimed in claim 8 wherein the portion of the predefined vocabulary elements considered relevant to a particular user are the predefined vocabulary elements considered relevant to a particular geographical region.

12. A personalized car radio receiver as claimed in claim 11 wherein the predefined vocabulary elements contained in the vocabulary memory include location point vocabulary elements and the only location point vocabulary elements contained in the vocabulary memory are the location point vocabulary elements within the particular geographical region.

13. A car radio receiver as claimed in claim 9, characterized in that it comprises a card reader and that the vocabulary memory and the auxiliary memory are accommodated on a removable card.

14. A personalized car radio receiver as defined in claim 9 wherein the predefined vocabulary elements stored in the vocabulary memory include location point vocabulary elements and only the location point vocabulary elements identifying location points within the particular geographical region are stored in the vocabulary memory.

15. A car radio receiver as claimed in claim 11, characterized in that it comprises a card reader and that the vocabulary memory and the auxiliary memory are accommodated on a removable card.

16. A car radio receiver as claimed in claim 12, characterized in that it comprises a card reader and that the vocabulary memory and the auxiliary memory are accommodated on a removable card.

17. A car radio receiver as claimed in claim 14, characterized in that it comprises a card reader and that the vocabulary memory and the auxiliary memory are accommodated on a removable card.

* * * * *